Nov. 28, 1961 M. B. GARDNER 3,010,417
TORPEDO CONTROL SYSTEM
Filed Dec. 26, 1946. 2 Sheets-Sheet 1
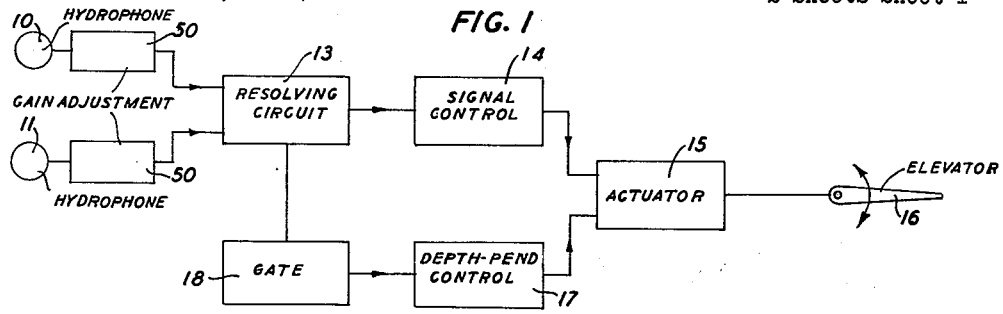
FIG. 1
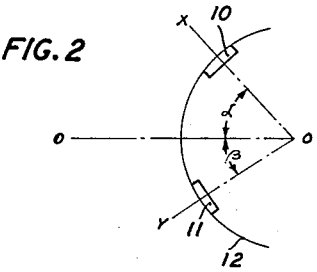
FIG. 2
FIG. 3
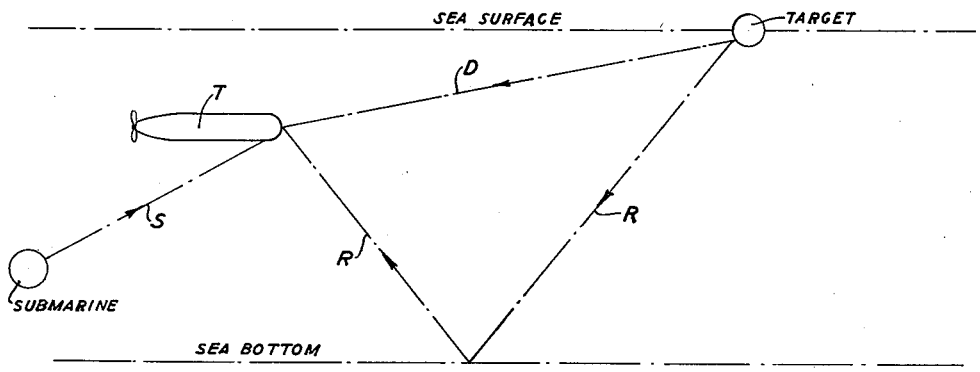
FIG. 4
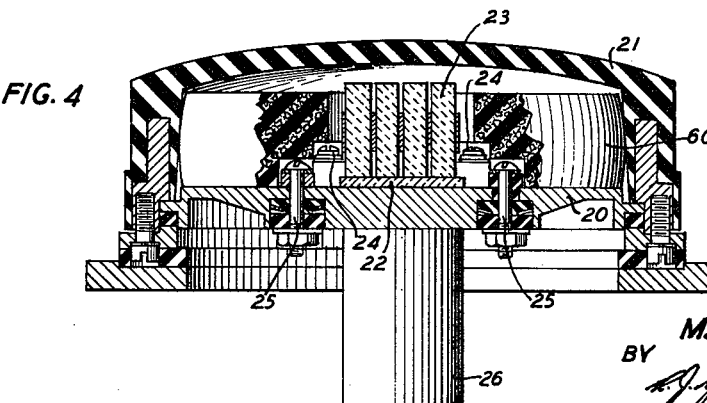
INVENTOR
M. B. GARDNER
BY
ATTORNEY Nov. 28, 1961    M. B. GARDNER    3,010,417
TORPEDO CONTROL SYSTEM
Filed Dec. 26, 1946    2 Sheets-Sheet 2

INVENTOR
M. B. GARDNER
BY
ATTORNEY

United States Patent Office 3,010,417
Patented Nov. 28, 1961

3,010,417
TORPEDO CONTROL SYSTEM
Mark B. Gardner, Summit, N.J., assignor to Bell Telephone Laboratories, Incorporated, New York, N.Y., a corporation of New York
Filed Dec. 26, 1946, Ser. No. 718,303
8 Claims. (Cl. 114—23)

This invention relates to control systems and more particularly to steering systems for sonically guided torpedoes.

In such steering systems, for example of the type and construction disclosed in the application Serial No. 555,523, filed September 23, 1944, of John C. Steinberg, both the elevator and rudder are subject to control in accordance with the relative outputs of a respective pair of hydrophones mounted upon the torpedo, responsive to ultrasonic signals due to propeller and machinery noises at a target vessel, and constructed and associated with a resolving circuit to produce a steering control signal of amplitude and polarity determined by the bearing and sign of the bearing angle, respectively, of the target vessel relative to the torpedo. The hydrophones, and particularly those included in the elevator control system, may receive signals other than those emanating directly from the target vessel, whereby incorrect steering may result for at least a portion of the run of the torpedo.

For example, in the case of a torpedo launched from a submarine, the hydrophones may receive signals emanating from the submarine. Also the hydrophones may receive signals initiated at the target but reflected from the sea bottom, particularly where the attack is made in relatively shallow sea areas, such as in harbors or near shores. Such submarine or reflected signals may result in a steering control signal which is not indicative or accurately representative of the position of the target vessel relative to the torpedo. The relative amplitudes of the several signals or signal components received by the hydrophones in the elevator control system might be such that the torpedo would be steered in the vertical dimension downwardly toward the sea bottom or the launching submarine instead of upwardly toward the target vessel. Protection for the submarine and also prevention of steering toward the sea bottom may be effected by the provision of a gate element in the elevator control circuit for disabling the sonic control portion of this circuit until or unless the torpedo reaches such position relative to the target that an up elevator control signal of at least a preassigned amplitude obtains. Such a gate element is not entirely satisfactory inasmuch as, generally, it entails either a loss in the effective target signal control range or addition of auxiliary apparatus, or both.

One general object of this invention is to prevent false vertical steering of a sonically guided torpedo.

More specifically, one object of this invention is to prevent steering of such a torpedo in the vertical dimension toward either the launching submarine or the sea bottom by sonic control.

In accordance with one feature of this invention, the elevator control circuit in a sonically guided torpedo is so constructed and arranged that the sensitivity of the system to signals emanating from points below the torpedo and at substantial angles thereto is substantially less than the sensitivity to signals emanating from points above the torpedo.

More specifically, in accordance with one feature of this invention and in one illustrative embodiment thereof, the upper and lower hydrophones, which are associated with the elevator control circuit, are constructed and arranged so that the directional response patterns of the two are different to provide greater control sensitivity to signals received from points above the torpedo than to signals received from below, to provide balance for self noise of the torpedo and to provide zero difference in the outputs of the two hydrophones when the torpedo is headed directly toward the target vessel.

In accordance with another feature of this invention, an auxiliary hydrophone is provided and is so associated with the elevator control circuit that whenever the torpedo is below a preassigned depth only an up elevator control signal can be produced.

The invention and the above-noted and other features thereof will be understood more clearly and fully from the following detailed description with reference to the accompanying drawing in which:

FIG. 1 is a diagram in block form of an elevator control system of the type to which this invention pertains;

FIG. 2 is a diagram in outline form showing the position of the hydrophones of the elevator control system in the nose of a torpedo, in one illustrative embodiment of this invention;

FIG. 3 is a diagram which will be referred to hereinafter in explaining conditions which might result in false steering of the kind which is prevented in accordance with this invention;

FIG. 4 is a sectional view of a hydrophone included in a torpedo illustrative of one embodiment of this invention;

Figure 5:
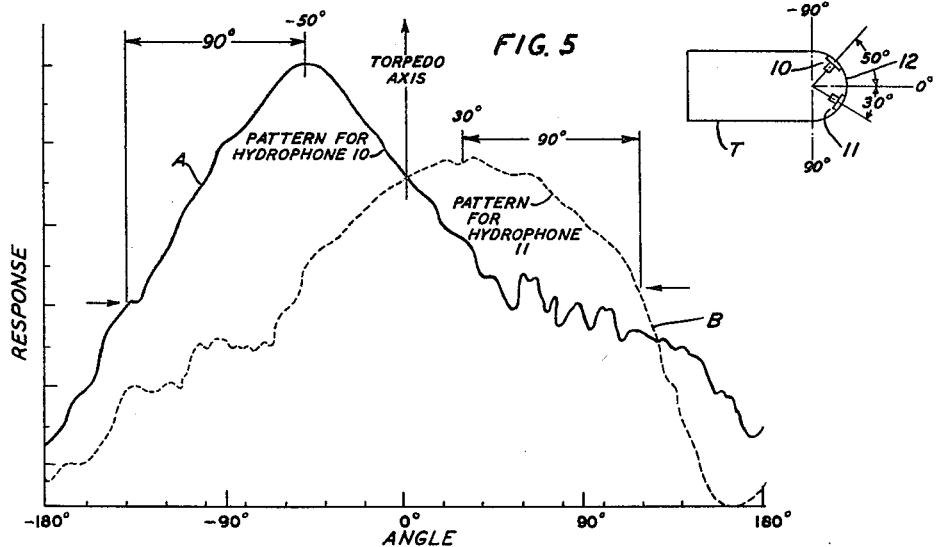
FIG. 5 is a graph showing typical directivity patterns of the two hydrophones of the elevator control system in one embodiment of this invention.

Referring now to the drawing, the control system illustrated in FIG. 1 is generally of the construction disclosed in detail in the application Serial No. 491,795, filed June 22, 1943, of Donald D. Robertson and comprises a pair of similar hydrophones 10 and 11 resonant or tuned to a preassigned ultrasonic frequency, for example of the order of 25 kilocycles per second, and as illustrated in FIG. 2 mounted in vertical alignment upon the nose or head portion 12 of a torpedo. For reasons which will appear presently, the two hydrophones 10 and 11 are mounted so that their axes of maximum response, XO and YO, respectively, are at different angles, $\alpha$ and $\beta$, respectively, to the longitudinal axis of the torpedo.

The hydrophones are connected, through gain adjusting elements 50, to a resolving circuit 13 which converts the hydrophone outputs in combination into a difference or control signal of amplitude proportional to and polarity determined by the relative magnitudes of the two hydrophone outputs. This signal is applied to a signal control element 14 which in turn controls an actuator 15 for the elevator 16 to effect deflection of the elevator in the direction determined by and to an extent proportional to the sign and magnitude, respectively, of the difference or control signal.

The control system includes also a depth and pendulum unit 17 which, while enabled, controls the actuator 15 to tend to maintain the torpedo level at a preassigned running depth. The unit 17 is subject to disabling by operation of a gate 18. The latter may be controlled from the resolving circuit 13 to operate when the underwater signal level at the hydrophones reaches a preassigned value or when the difference signal aforenoted reaches a prescribed amplitude. Alternatively, the gate may be controlled to operate when the torpedo, after launching, rises above a prescribed ceiling or has traversed a specified distance.

As illustrated in FIG. 3, after the torpedo T has been launched from a submarine toward a target, the hydrophones may receive underwater signals directly from the target along paths represented by the arrowed line D. They may receive also such target signals reflected from the sea bottom, along paths indicated by the arrowed lines R. Additionally, they may receive signals emanating from the launching submarine, along paths represented by the arrowed line S. All of the signals received by the hydrophone may include components of frequencies to which the hydrophones are responsive. Also, because of diffraction or shielding effects of the torpedo the intensity of the signals from the submarine or of the reflected target signals may be different at the two hydrophones. Consequently, it is apparent that false steering of the torpedo could result, e.g., the torpedo might steer toward the bottom or downwardly toward the submarine instead of upwardly toward the target.

Two factors of importance from the standpoint of correct steering may be noted. First, the effective output of the two hydrophones should be such that when the torpedo is headed directly toward the target, the difference or control signal heretofore noted should be zero. Secondly, the circuit should be balanced for self noise, i.e., for underwear signals of frequencies to which the hydrophones are responsive due, for example, to the propulsion mechanism of the torpedo and to passage of the torpedo through the water. Stated in another way, the self noise in itself should produce a zero difference or control signal.

In accordance with one feature of this invention, not only are the desired zero difference or control signals for self noise and on target course obtained, but also false steering due to receipt by the hydrophones of reflected target signals or submarine signals is prevented. More specifically, in one embodiment, the two hydrophones 10 and 11 are so mounted relative to the longitudinal axis of the torpedo and have such directional response patterns that the sensitivity of the two in combination to signals emanating from points above the torpedo is greater than for signals from points below the torpedo, and for signals emanating from points aligned or substantially aligned with the torpedo axis, the responses of the two hydrophones are equal or substantially so.

A suitable hydrophone construction is illustrated in FIG. 4 and comprises a mounting plate 20 to which a cup-shaped cover or housing 21 of a material, such as commercially available forms of rubber, highly transparent to ultrasonic compressional wave energy is joined to form a fluid-tight casing or enclosure. The casing or enclosure has therein a filling of a liquid, such as deaerated castor oil, having substantially the same impedance as sea water to the transmission of ultrasonic compressional wave energy. Mounted upon the plate 20, as by a ceramic wafer 22 cemented thereto, is a piezoelectric crystal unit 23 composed, for example, of four substantially identical, rectangular 45 degrees Y-cut ammonium dihydrogen phosphate blocks arranged for vibration in the longitudinal mode. The four blocks are connected electrically in parallel and to terminals 24 secured to the plate 20 by bolts 25. The piezoelectric unit is of substantially square cross-section with each side approximately equal to one-half wavelength, in sea water, of the frequency to which the hydrophone is intended to be tuned. The height of the block, i.e., its dimension normal to the plate 20, is made equal to one-quarter wavelength of this frequency. Also mounted by the plate 20 is a backing resonator 26 of length equal to one-quarter wavelength of the frequency noted, whereby the crystal block and resonator in combination constitute a half wavelength vibrator having a vibrational antinode at or substantially at the plate 20.

In use, the hydrophone is mounted within the head or nose 12 of the torpedo, with the base of the cover or housing 21 in face-to-face engagement with the inner surface of the head or nose. The response, as a function of angle of signal incidence, of the hydrophone thus mounted at an angle of $\alpha=50$ degrees to the longitudinal axis of the torpedo is as shown by the curve A in FIG. 5. The maximum response is for normal signal incidence, i.e., signal incidence parallel to the axis of alignment of the crystal block 23 and backing resonator, and, as is apparent, the response pattern is relatively sharp.

The response pattern may be broadened in several ways. A particular advantageous way which results in substantial reduction of the response for normal and near normal incidence angles without serious degradation of the response at greater incidence angles involves the use of an annular block or insert 60 of a compressional wave energy insulating material, such as a cork and neoprene composition known commercially as "Corprene." The response of a hydrophone of the construction illustrated in FIG. 4 and including such a "Corprene" insert, the hydrophone being mounted within the head or nose of the torpedo and at an angle $\beta=30$ degrees to the longitudinal axis of the torpedo is as illustrated by the curve B of FIG. 5. The maximum response is for normal signal incidence, i.e., signal incidence parallel to the axis of alignment of the crystal block 23 and backing resonator 26. As is apparent, the response pattern, curve B, for the hydrophone 11 is broader than that, curve A, for the hydrophone 10.

At this point it may be noted that it has been found that the difference in the level of torpedo self noise which reaches two hydrophones of the construction illustrated in FIG. 4 and mounted at an angle of 50 degrees or less to the longitudinal axis of the torpedo is substantially equal to the pattern difference of the two hydrophones for signals incident 90 degrees to the hydrophone axis. Thus, if the two signal channels, i.e., those including the top and bottom hydrophones 10 and 11, are appropriately correlated, as by adjustment of the gain thereof, the two channels will be balanced for self noise. In FIG. 5, the two curves A and B represent the response with the two channels thus correlated.

It will be noted from FIG. 5 that the two response curves cross at zero degrees, i.e., for signals incident parallel to the longitudinal axis of the torpedo, so that the two channels are balanced and zero difference or control signal obtains. Further, the sensitivity of the system to signals emanating from points below the torpedo, i.e., for positive incidence angles measured from the torpedo axis, is substantially smaller than for signals emanating from points above the torpedo. Thus, as will be apparent, the steering system is more responsive to signals emanating from a target above the torpedo than to either signals from a submarine or signals reflected from the sea bottom. Consequently, the possibilities of false steering of the torpedo are minimized and, because of the cross-over of the response patterns at zero degrees and the similarity of the form thereof for angles near zero degrees, accurate tracking of the target in the vertical dimension is obtained.

Figure 6:
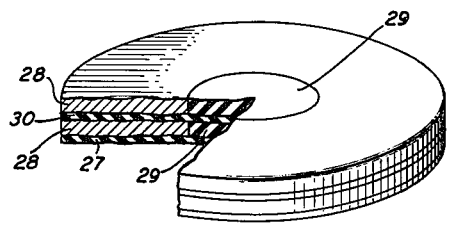
FIG. 6 is a perspective view, partly broken away, of a unit which may be employed to alter the directional response pattern of a hydrophone, such as the hydrophone illustrated in FIG. 4.

The different response patterns for the two hydrophones may be obtained other than by provision of the "Corprene" block or insert 60. For example, a broadened pattern for a hydrophone of the construction shown in FIG. 4 but without the block or insert 60 can be obtained by interposing between the cap 21 and the inner wall of the torpedo nose or head an insert of the sandwich construction illustrated in FIG. 6. As shown in this figure, the insert comprises a layer 27 of neoprene which, in use, bears against the inner wall of the torpedo nose or head, two similar annuli 28 of lead having central circular neoprene inserts 29, and a layer 30 of neoprene between the two lead-neoprene discs.

The desired different patterns can be obtained also by employing a higher frequency in one hydrophone and its associated channel than in the other, the higher frequency resulting in a sharper response pattern.

In any case, the criteria to be satisfied are cross-over of the two patterns at zero degrees, i.e., for signals incident parallel to the longitudinal axis of the torpedo, balance on self noise, and a broader and smaller peak response for the lower hydrophone 11 than for the upper hydrophone 10.

Figure 7:
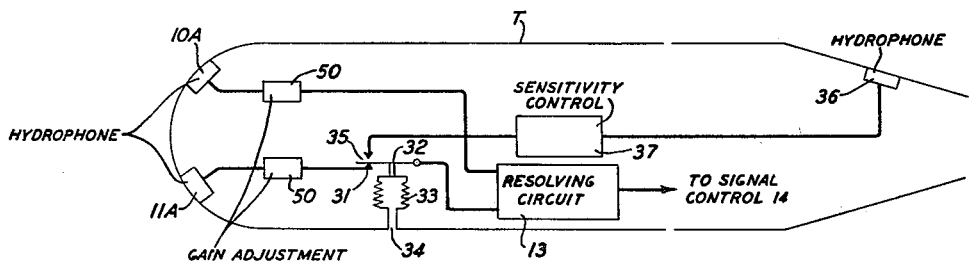
FIG. 7 is a diagram in outline and block form of an elevator control system illustrative of another embodiment of this invention.

In another embodiment of this invention, the desired difference in the sensitivity of the system to signals emanating from above and below the torpedo is realized or accentuated by the provision of an auxiliary hydrophone. In this embodiment, illustrated in FIG. 7, the upper and lower hydrophones 10A and 11A, respectively, may be the same and mounted the same as the hydrophones in the embodiment heretofore described or they may be identical, have identical directional response patterns and be mounted in vertical alignment at equal angles to the longitudinal axis of the torpedo. The upper hydrophone 10A is connected permanently to the resolving circuit 13 and the lower hydrophone 11A is connected to this circuit over the contact 31 and armature 32 of a bellows operated switch, the bellows 33 of which is coupled to the armature and has its interior in communication with the sea by way of a port 34 in the torpedo body. The switch is constructed so that the armature 32 is disengaged from the contact 31 and engages another contact 35 whenever the torpedo is below a preassigned depth.

The auxiliary hydrophone 36 is mounted upon the torpedo body well toward the rear thereof and is adapted to be connected to the resolving circuit 13 through a sensitivity control 37 and over the contact 35 and armature 32 of the bellows operated switch. Because of the location of the hydrophone 36, the self noise level thereat is relatively high, sufficiently so as to override any target or launching submarine signals. The sensitivity control 37 introduces attenuation adjusted so that the system is balanced on torpedo self noise, i.e., so that in the absence of signals from a target or the launching submarine, the difference or control signal derived from the resolving circuit is zero.

The torpedo is launched, normally, at a depth below that at which the bellows contracts to effect engagement of the armature 32 with the contact 31. Inasmuch as the lower hydrophone 11A then is disconnected and, further, inasmuch as the self noise level at the auxiliary hydrophone 36 is high as noted above, it will be appreciated that only an up elevator difference or control signal can be produced, even though the underwater signals received at the hydrophone 10A emanate from a point below the torpedo. Thus, the torpedo proceeds, and rises until the preassigned depth is reached, at which depth the bellows operated switch operates to transfer the armature from contact 35 to contact 31, whereby the auxiliary hydrophone 36 is disconnected from the resolving circuit 13 and the hydrophone 11A is connected thereto. Thereafter, the torpedo is guided to the target, in the vertical dimension, in accordance with the difference in the target signal levels received at the two hydrophones. The point at which the bellows switch operates advantageously is such that the target signals predominate over other underwater signals, e.g., those emanating from the launching submarine or those reflected from the sea bottom. Should conditions arise which result in the torpedo diving, when the preassigned depth is reached, the bellows switch would operate to dissociate the hydrophone 11A from the resolving circuit and couple the auxiliary hydrophone 36 to the circuit, whereupon the torpedo would be steered upwardly to a position such that the elevator would be brought under target signal control.

Although specific embodiments of the invention have been shown and described, it will be understood that they are but illustrative and that various modificaions may be made therein without departing from the scope and spirit of this invention as defined in the appended claims.

What is claimed is:

1. A control system for a torpedo, comprising an elevator, a pair of signal channels, and means for actuating said elevator in accordance with the relative outputs of said channels, one of said channels comprising a first hydrophone mounted upon the torpedo above the longitudinal axis thereof and the other of said channels including a second hydrophone mounted upon the torpedo below said axis, said hydrophones having similar directional response patterns each embracing a field of substantially 360 degrees and characterized by a maximum for normal signal incidence and the maximum for said second hydrophone being less than that for said first hydrophone, and said hydrophones being positioned at unequal angles to said axis and such that the outputs of said channels are equal for signals incident upon said hydrophones parallel to said axis.

2. A control system for a torpedo, comprising an elevator, a pair of signal channels, means for actuating said elevator in accordance with the relative outputs of said channels, each of said channels including a hydrophone at the input end thereof, one of said hydrophones having a directional response pattern characterized by a maximum for signals incident at a preassigned angle relative to and above the longitudinal axis of the torpedo and the other of said hydrophones having a similar directional response pattern characterized by a maximum of less amplitude than said first maximum for signals incident at a second preassigned angle relative to and below said axis and smaller than said first angle, and means for adjusting the relative gains of said channels so that the outputs thereof are equal for signals incident upon said hydrophones parallel to said axis.

3. A control signal for a torpedo, comprising an elevator, a pair of signal channels, and means for actuating said elevator in accordance with the relative outputs of said signal channels, one of said channels including a first hydrophone having a directional response pattern characterized by a maximum for signals incident at a first angle not substantially greater than 50 degrees relative to and above the longitudinal axis of the torpedo, the other of said channels including a second hydrophone having a similar directional response pattern characterized by a maximum, less than said first maximum, for signals incident at a second angle relative to and below said axis and smaller than said first angle, the relative gains of said channels being such that said channels are balanced for torpedo self noise and said first and second angles being such that the outputs of said channels are equal for signals incident parallel to said axis.

4. A control system for a torpedo, comprising an elevator, a pair of signal channels, means for actuating said elevator in accordance with the relative outputs of said channels, each of said channels comprising a hydrophone of the longitudinally vibratile piezoelectric crystal type, the two hydrophones having similar directional response patterns each characterized by a maximum for normal signal incidence and the maximum for one hydrophone being greater than that for the other, and means for adjusting the relative gain of the two channels so that the responses of the two are equal for signals incident tangentially to the respective hydrophone, said hydrophones being mounted at different angles relative to and above and below the longitudinal axis of the torpedo such that the outputs of the two channels are equal for signals incident upon the hydrophones parallel to said axis.

5. A control system for a torpedo, comprising an elevator, a pair of signal channels, means for actuating said elevator in accordance with the relative outputs of said channels, one of said channels including a first hydrophone of the piezoelectric crystal type at its input end, said hydrophone being mounted on the nose portion of the torpedo, above the longitudinal axis of the torpedo and having a directional response pattern characterized by a maximum for signals incident at a preassigned angle relative to and above said axis, the other of said channels including a second hydrophone at its input end, said second hydrophone being mounted on said nose portion below said axis, in vertical alignment with said first hydrophone and having a directional response pattern characterized by a maximum of less amplitude than said first maximum, for signals incident at a second preassigned angle, less than said first angle, relative to and below said axis, said angles and the relative gains of said channels being such that the outputs of said channels are equal for signals incident parallel to said axis and the output of each channel for signals incident normal to the direction of maximum response of its respective hydrophone is equal to that of the other for signals incident normal to the direction of maximum response of its respective hydrophone.

6. A control system for a moving body, comprising a steering member for steering the body in the vertical dimension, a pair of signal channels, and means for actuating said steering member in accordance with the difference in the outputs of said channels, one of said channels including a first signal translating means at its input end, mounted on the body and having a directional response pattern characterized by a maximum for signals incident at a preassigned angle of one sign relative to the longitudinal axis of the body, the other of said channels including a second signal translating means at its input end, mounted on the body and having a directional response pattern characterized by a maximm less than said first maximum for signals incident at a second preassigned angle of sign opposite to and of magnitude less than that of said first angle, relative to said axis, and said channels having relative gains such that the outputs thereof are equal for signals incident parallel to said axis.

7. A control system for a torpedo, comprising an elevator, a pair of signal channels, means for actuating said elevator in accordance with the relative outputs of said channels, one of said channels comprising a first hydrophone mounted upon the torpedo above the longitudinal axis thereof and the other of said channels including a second hydrophone mounted upon the torpedo below said axis, said hydrophones having similar directional response patterns each characterized by a maximum for normal signal incidence and the maximum for said second hydrophone being less than that for said first hydrophone, and said hydrophones being positioned so that the outputs of said channels are equal for signals incident upon said hydrophones parallel to said axis, an auxiliary hydrophone mounted upon the torpedo above said axis and to the rear of said first hydrophone, sensitivity control means associated with said auxiliary hydrophone for balancing the output thereof for torpedo self noise to that of said first hydrophone, and means for coupling said auxiliary hydrophone into said other channel and dissociating said second hydrophone from said other channel whenever the torpedo is below a prescribed depth and for dissociating said auxiliary hydrophone from said other channel and coupling said second hydrophone thereto when the torpedo is at or above said depth.

8. A steering system for a torpedo, comprising an elevator, a pair of signal channels, means for actuating said elevator in accordance with the difference in the outputs of said channels, a first hydrophone at the input end of one of said channels, a second hydrophone, said first and second hydrophones having similar directional response patterns coincident for signals incident parallel to the longitudinal axis of the torpedo and each characterized by a maximum for signals incident parallel to its axis, the two hydrophones being mounted on the nose of the torpedo with their axes at angles to the longitudinal axis of the torpedo, and said first and second hydrophones being above and below said longitudinal axis respectively, an auxiliary hydrophone mounted upon the torpedo above said longitudinal axis and toward the tail of the torpedo, means for balancing the output of said auxiliary hydrophone with that of said first hydrophone, for torpedo self noise, and means for coupling said second hydrophone to the other of said channels only when the torpedo is at or above a prescribed depth and for coupling said auxiliary hydrophone to said other channel only when the torpedo is below said depth.

References Cited in the file of this patent
UNITED STATES PATENTS

| | | |
|---|---|---|
| 1,312,809 | Scribner et al. | Aug. 12, 1919 |
| 1,381,640 | Horton | June 14, 1921 |
| 1,969,005 | Hecht | Aug. 7, 1934 |
| 2,382,058 | Hull | Aug. 14, 1945 |